United States Patent
Saakes et al.

(10) Patent No.: US 10,541,439 B2
(45) Date of Patent: Jan. 21, 2020

(54) METHOD FOR OPERATING OF A REGENERATIVE BIPOLAR MEMBRANE FUEL CELL, AND REGENERATIVE BIPOLAR MEMBRANE FUEL CELL THERE FOR

(71) Applicant: W & F Beheer B.V., Schiedam (NL)

(72) Inventors: Machiel Saakes, Leeuwarden (NL); Hubertus Victor Marie Hamelers, Leeuwarden (NL); Willem Johannes van Egmond, Leeuwarden (NL)

(73) Assignee: W & F Beheer B.V., Schiedam (NL)

( * ) Notice: Subject to any disclaimer, the term of this patent is extended or adjusted under 35 U.S.C. 154(b) by 104 days.

(21) Appl. No.: 15/556,887

(22) PCT Filed: Mar. 24, 2016

(86) PCT No.: PCT/NL2016/050207
§ 371 (c)(1),
(2) Date: Sep. 8, 2017

(87) PCT Pub. No.: WO2016/159761
PCT Pub. Date: Oct. 6, 2016

(65) Prior Publication Data
US 2018/0198151 A1 Jul. 12, 2018

(30) Foreign Application Priority Data
Mar. 27, 2015 (NL) .................. 2014541

(51) Int. Cl.
*H01M 8/18* (2006.01)
*H01M 8/2455* (2016.01)
(Continued)

(52) U.S. Cl.
CPC ....... *H01M 8/188* (2013.01); *H01M 8/04746* (2013.01); *H01M 8/186* (2013.01);
(Continued)

(58) Field of Classification Search
None
See application file for complete search history.

(56) References Cited

U.S. PATENT DOCUMENTS

| | | | |
|---|---|---|---|
| 4,311,771 A | 1/1982 | Walther | |
| 2002/0020623 A1* | 2/2002 | Speranza | ............... C25B 15/02 204/228.5 |
| 2006/0003203 A1* | 1/2006 | Wang | .................... B82Y 30/00 429/421 |

OTHER PUBLICATIONS

Zholkovskij et al., The storage battery with bipolar membranes, Journal of Membrane Science, vol. 141, Issue 2, Apr. 15, 1998, pp. 231-243.

* cited by examiner

*Primary Examiner* — Ula C Ruddock
*Assistant Examiner* — Tony S Chuo
(74) *Attorney, Agent, or Firm* — Michael J. Blessent; Bret E. Field; Bozicevic, Field & Francis LLP

(57) ABSTRACT

The invention relates to a method for operating a regenerative bipolar membrane fuel cell and regenerative bipolar cell for storing and generating energy. The method according to the invention comprises: —providing a regenerative bipolar membrane fuel cell comprising: —a reactor with an anode compartment having an anode and a cathode compartment having a cathode; and —a number of cell units separating the anode and cathode compartments, wherein the cell unit comprises an anion exchange membrane, a cation exchange membrane, and a bipolar, with the membranes defining compartments; —providing a fluid on both sides of the bipolar membrane with ion concentrations such that water activity difference between the fluids on both sides of the bipolar membrane is minimized; —storing energy in an energy storage state by providing an external current to the reactor such that a p H difference between fluids in contact with the bipolar membrane is achieved; —switching (Continued)

between the energy storage state and an energy generation state; and —regenerating energy in the energy generating state from the p H difference between fluids in contact with the bipolar membrane.

18 Claims, 14 Drawing Sheets

(51) Int. Cl.
    *H01M 8/04746*     (2016.01)
    *H01M 8/22*     (2006.01)
(52) U.S. Cl.
    CPC ......... *H01M 8/227* (2013.01); *H01M 8/2455* (2013.01); *H01M 2250/10* (2013.01); *Y02B 90/14* (2013.01); *Y02E 60/528* (2013.01)

METHOD FOR OPERATING OF A REGENERATIVE BIPOLAR MEMBRANE FUEL CELL, AND REGENERATIVE BIPOLAR MEMBRANE FUEL CELL THERE FOR

The present invention relates to a method for operating of a regenerative bipolar membrane fuel cell capable of storing and generating energy. This enables energy storage in a time period of an energy surplus and using this energy in a time period of energy shortage. Temporarily storage of energy is important to match supply and demand of energy, and for peak shaving of the energy demand. For example, this enables energy storage supplied by solar energy, wind energy, water energy etc.

Conventional energy storage devices include batteries that do not provide a sustainable approach on the long term due to the decreased reserves of many important elements needed for battery production.

Conventional energy generating methods may involve performing a reversed electro-dialyses process (RED) as described in WO 2007/094659 using differences in electrolyte solutions. Such differences are present between sea water and river water, for example. Such RED process can also be used to neutralize acidic and caustic effluent waste streams, such as in the semi-conductor industry, and generating energy while these waste streams are treated. For example, US 2013/0288142 discloses such waste stream treatment process with a RED system comprising a bipolar membrane.

Conventional methods and devices are confronted with the problem how to regenerative store and generate energy in order to match energy supply and energy demand in an effective manner.

The present invention has for its object to provide a method for operating of a regenerative bipolar membrane fuel cell configured for storing and generating energy and capable of energy storage in time periods of energy surplus and energy discharge in time periods of energy shortage in an effective manner.

This objective is achieved with the method for operating of a regenerative bipolar membrane fuel cell according to the present invention, wherein the method comprises the steps of:

providing a regenerative bipolar membrane fuel cell comprising:
  a reactor with an anode compartment having an anode and a cathode compartment having a cathode; and
  a number of cell units separating the anode and cathode compartments, wherein the cell unit comprises an anion exchange membrane, a cation exchange membrane, and a bipolar membrane, with the membranes defining compartments;
providing a fluid on both sides of the bipolar membrane with ion concentrations such that water activity difference between the fluids on both sides of the bipolar membrane is minimized;
storing energy in an energy storage state by providing an external current to the reactor such that a pH difference between fluids in contact with the bipolar membrane is achieved;
switching between the energy storage state and an energy generation state;
and
regenerating energy in the energy generating state from the pH difference between the fluids in contact with the bipolar membrane.

Providing a regenerative bipolar membrane fuel cell enables storing of electrical energy using a system comprising a cation exchange membrane, a bipolar membrane and an anion exchange membrane. Between the membranes compartments are defined. The system is also capable of generating electrical energy with the same membrane configuration. This obviates the need for using different membrane configurations in the different states or operations of the system according to the invention. This provides an effective method for regenerative storing and generating energy.

In an energy storage state, an external current is supplied to the reactor. More specifically, the current is supplied such that a concentration gradient, involving a pH difference, between the anode and cathode compartments is achieved. This involves performing an electrodialysis (ED) process. Such electro-dialyses process is for example described in WO 2007/094659 and involves applying a voltage between the anode and cathode such that positive ions will be inclined to move to the cathode, while the negative ions will be inclined to move to the anode. Due to the use of ion exchange membranes, the actual feed flows through a compartment will change in (alternating) concentrated and diluted electrolyte solutions.

According to the invention, in the energy storage state, providing an external current achieves that the concentration of the fluids in contact with the bipolar membrane increase. Preferably, these fluids are an acid fluid and a base fluid. This achieves a pH difference between the fluids that are in contact with the bipolar membrane on different sides thereof. In a presently preferred embodiment of the invention the concentration of the third solution, a salt solution, decreases.

When energy demand is higher than the energy supply, the system can be switched from the energy storage state to the energy generation state such that energy can be (re)generated from the concentration gradient. This involves performing a reverse electrodialysis (RED) process which is also described in WO 2007/094659. Due to the concentration differences between the concentrated and diluted electrolyte solutions, ions will be inclined to move from the high to the low concentrations. Due to membranes limiting freedom of movement of the ions, there will be nett transport of cations and anions in opposite directions such that to maintain electric neutrality at the anode and cathode, reactions take place such that electrons may flow from the anode to the cathode, thereby creating an electric current.

According to the invention, in the energy generation state, the pH difference between the fluids that are in contact with the bipolar membrane on different sides thereof achieves an electric current. In a presently preferred embodiment of the invention ions are transported to the salt solution to maintain electric neutrality.

In the energy (re)generation state generating energy preferably comprises water splitting that preferably takes place in the bipolar membrane. In the energy generation state, at the boundary or intermediate layer between the anion part and the cation part of the bipolar membrane, $H_2O$ is formed due to $H^+$ arriving at this boundary through the cation part of the bipolar membrane and OH arriving at this boundary through the anion part of the bipolar membrane. $H_2O$ exits the bipolar membrane in preferably both directions to the adjacent compartments, preferably in equal amounts.

At the cathode, water splitting can be performed performing $4H_2O+4e^- \rightarrow 2H_2+4OH^-$, while at the anode, the anode reaction may involve $2H_2O \rightarrow 4e^-+O_2+4H^+$. These reactions take place in one of the possible embodiments according to the present invention. It will be understood that alternative reactions in the electrode compartments could also be envisaged in accordance with the invention.

Electrons run from the anode to the cathode via an external circuit thereby generating energy. The incoming fluids are diluted in the energy generation state. Energy is generated using the (ionic) concentration differences between the different fluids in the different compartments of the reactor.

In the energy generation state water is produced at the interface of the anion and cation parts of the bipolar membrane. The produced water exits the bipolar membrane on one of the sides thereof. Therefore, this water dilutes the solutions that are in contact with one of the side surfaces of the bipolar membrane. This influences the energy generation efficiency. In case the tendency of the produced water flow is more towards one of the two solutions that are in direct contact with one of the side surfaces of the bipolar membrane, the energy generation efficiency is negatively effected even more.

In accordance with the present invention the difference in water activity of both fluids in contact with the bipolar membrane is preferably minimized in at least the energy generation state. This has the effect that the water that is produced in the bipolar membrane is preferably equally distributed over the two fluids that are in contact with the bipolar membrane, thereby minimizing the diluting effect on the efficiency of the energy generation.

Bipolar membranes can be provided as single layer or single film membrane with one side surface being treated to act as anion exchange part and the other side surface being treated to act as cation exchange part. Also, bipolar membranes can be provided as laminated membranes, also referred to as multi-layer membranes. For example, the laminated bipolar membrane can be provided as a two layer membrane with an anion exchange layer and a cation exchange layer, or as a three layer membrane having an intermediate layer between the anion and cation exchange layers. In practice, when using laminated bipolar membranes, ballooning or delaminating of the laminated bipolar membrane may occur in case of an unequal water activity of the liquids in contact with the bipolar membrane. This significantly limits the applicability and/or efficiency of such bipolar membrane and any energy generating process using such laminated bipolar membrane.

As a further effect of minimizing the difference in water activity of the fluids on both sides of the bipolar membrane during the energy generation, the risk of ballooning or delaminating of the laminated bipolar membrane is significantly reduced. It is shown that a difference in water activity of both fluids in contact with the laminated bipolar membrane significantly contributes to the problems of ballooning and delaminating that have been experienced in conventional methods and/or systems.

According to the invention, providing fluids on both sides of the bipolar membrane with ion concentrations, according to the invention involving a pH difference between the fluids on both sides of the bipolar membrane, such that the difference in water activity of both fluids in contact with the bipolar membrane is minimized, prevents so-called ballooning and delaminating of the laminated bipolar membrane.

Therefore, the method according to the present invention enables the use of a bipolar membrane for regenerative storing and generating energy in a system having the same membrane configuration in both the energy storage state and the energy generation state, thereby achieving an effective regenerative energy storing and generating method using a single or multi-layer bipolar membrane. In fact, the energy generation can be performed efficiently due to keeping the difference in water activity of the fluids on both sides of the bipolar membrane minimal. In addition, maintaining the difference in water activity of both fluids in contact with the bipolar membrane minimal, provides a solution to the ballooning and delaminating problems that occur with laminated bipolar membranes and render conventional methods and systems ineffective.

As a further advantage, the method according to the present invention provides an energy storage and regeneration that is safer and more cost effective as compared to conventional approaches.

Furthermore, the method according to the invention can be applied in so-called stand-alone applications, in other words in off-grid applications, thereby also enabling effective energy storage in remote areas, for example.

The present invention can be applied advantageously, especially in relation to storing and (re)generating electrical energy originating from renewable energy sources, like solar energy, wind energy etc. The storage of such energy is possible with the increased energy density as compared to a method and/or system using a salt gradient in a RED process. The present invention enables higher energy densities, for example of factor 10-30 higher, as compared to salinity gradients that are based on diluted and concentrated salt solutions. For example, using diluted and concentrated salt solutions, energy density is about 0.5-1 kWh/m$^3$.

Especially the use of a bipolar membrane that enables the combination of protons and hydroxide ions to water inside this membrane provides an effective means enabling increasing the energy density. For example, if the method according to the invention during application of an external current generates an amount of 22.2 Wh is stored in the volume of 1 liter of 1 molair acid solution and 1 liter of 1 molair base solution. This corresponds to 22.2 kWh/2 m$^3$, or 11.1 kWh/m$^3$. For an average household to be able dealing with the day-night regime of energy supply and energy demand, typically an energy storage capacity in the range of 10-20 kWh would be required. In this example, this storage capacity can be achieved with a volume of 1 to 2 m$^3$. It will be understood that in case of higher concentrations for the fluids being used, the required volume can be decreased even further.

Preferably, the system is operated in a temperature range of −20 to +100° C., more preferably in a temperature range of −10 to +80° C. The electrodes preferably have a sufficiently high electrical conductivity and catalytic activity towards water oxidation and water reduction. Possible materials include graphite, carbon, titanium coated with a (mixed) metal oxide like e.g. $Pt_xIr_y$, $Ru_xIr_y$, $RuO_x$, $Ta_xIr_y$, and Ti coated with a noble metal like Pt.

In a presently preferred embodiment according to the present invention, in use, the reactor is provided with three fluids, the first fluid comprising a salt solution, the second fluid comprising an acid solution and a third fluid comprising a base solution.

The provision of three fluids provides an effective system to store and generate energy. The acid and base solutions are provided on opposite sides of the bipolar membrane thereby defining a pH difference of both fluids in contact with the bipolar membrane. The salt fluid is provided in another compartment and is not in direct contact with the bipolar membrane.

In the energy generation state the cell unit in the reactor according to the present invention preferably comprises three chambers that are defined with a cation exchange membrane, an anion exchange membrane and a bipolar membrane. These membranes define the cell unit with the three compartments, thereby enabling providing three different fluids to the unit. In the energy generation state the fluids are provided, such that there is a pH difference between the fluids on both sides of the bipolar membrane and that are in direct contact with the bipolar membrane, while the difference in water activity of the fluids in contact with the bipolar membrane is kept to a minimum. Preferably, in the energy generation state water is formed at the intermediate layer between the cation and anion layers of the bipolar membrane.

Preferably, the salt solution comprises one or more of the following ions: $Li^+$, $Na^+$, $K^+$, $Mg^{2+}$, $Ca^{2+}$, $Ba^{2+}$, and $Cl^-$, $F^-$, $Br^-$, $I^-$, $SO_4^{2-}$, $NO_3^-$, $ClO_4^-$.

Furthermore, preferably the base solution comprises one or more of the following ions: $Li^+$, $Na^+$ and $K^+$, $Mg^{2+}$, $Ca^{2+}$, $Ba^{2+}$, and $OH^-$.

Preferably, the acid solution comprises one or more of the following ions: $H^+$, and $F^-$, $Cl^-$, $Br^-$, $I^-$, $SO_4^{2-}$, $NO_3^-$, $ClO_4^-$.

In a presently preferred embodiment according to the invention the method is applied using an acid solution comprising HCl, the base solution comprises LiOH and/or NaOH and/or KOH, and the salt solution comprises LiCl and/or NaCl and/or KCl.

In an alternative preferred embodiment according to the invention the method is applied using an acid solution comprising $HNO_3$, the base solution comprises LiOH and/or NaOH and/or KOH, and the salt solution comprises $LiNO_3$ and/or $NaNO_3$ and/or $KNO_3$.

In a presently preferred embodiment according to the invention the method is applied using a NaCl salt solution, NaOH base solution and HCl acid solution. It is shown that a concentration of 0.5 mol/l for these three fluids resulted in an effective method for regenerative storing and generating of energy. For the solution in the electrode compartments use is made of a fluid comprising 0.5 mol/l $Na_2SO_4$. It will be understood that other solutions for the electrodes could also be envisaged in accordance with the present invention.

In a presently preferred embodiment according to the invention the combination of NaCl and $H_2O$ for electrodialysis/energy storage and the combination of HCl and NaOH for RED/energy generation is used. This provides an effective operation for storing and generating energy. Especially NaCl with NaOH and HCl, and $Na_2SO_4$ for the electrode compartments, can be used effectively in the method according to the invention.

In a presently preferred embodiment according to the invention the difference in water activity of both fluids in contact with the bipolar membrane is maintained within the range of −0.015 to +0.015, and preferably in the range of −0.012 to +0.012, and most preferably in the range of −0.01 to +0.01.

Maintaining the difference in water activity of both fluids in contact with the bipolar membrane within these ranges improves the overall efficiency of the method and prevents ballooning and/or delaminating of the (laminated) bipolar membrane and limits the unequal transport of the generated water inside the bipolar membrane to both fluids in contact with the bipolar membrane.

In a presently preferred embodiment according to the present invention, the method further comprises the step of providing an additional electrolytic fluid and/or an organic compound to one or more of the fluids, such that water activity of such fluid is maintained.

Providing an additional electrolytic fluid providing a background electrolyte and/or an organic compound enables keeping water activity substantially equal at both sides of the bipolar membrane, while the pH difference between the liquids in contact with the bipolar membrane can be used to generate electrical energy. Such background electrolyte may comprise electrolyte, for example NaCl, KCl, $KNO_3$ having a concentration in the range of 0.1 to 3 mol/l. Preferably, all solutions are provided with such background electrolytic fluid to maintain a substantially equal water activity at both sides of the bipolar membrane. This provides an effective method for storing and generating electrical energy with the reactor maintaining its configuration during the different states of the method.

In a further preferred embodiment according to the present invention, the method further comprises the step of controlling the difference in water activity of both fluids in contact with the bipolar membrane.

When storing and/or generating electrical energy, the difference in water activity of both fluids in contact with the bipolar membrane may start to change due to changing concentrations, for example. By controlling the difference in water activity of both fluids in contact with the bipolar membrane within boundaries, preferably keeping this difference in water activity of both fluids in contact with the bipolar membrane to a minimum, problems with ballooning and/or delaminating of the (laminated) bipolar membrane can be prevented, and the overall efficiency of the method is improved.

In a presently preferred embodiment according to the present invention, the difference in water activity between both fluids in contact with the bipolar membrane can be controlled by controlling at least one of the fluids in contact with the bipolar membrane in relation to pump speed involving a pump controller.

By controlling pump speed the flow speed of the individual fluid(s) can be controlled effectively, thereby enabling manipulation of the difference in water activity of the fluids in contact with the bipolar membrane. As an alternative thereto, or in combination therewith, the amount of background electrolytic fluid that is supplied to one or more of the fluids can be controlled.

Controlling the difference in water activity difference between both fluids in contact with the bipolar membrane during operation improves the overall efficiency of the method and prevents the system reaching operating conditions that could result in ballooning and/or delaminating of the (laminated) bipolar membrane.

The invention further relates to a regenerative bipolar membrane fuel cell for storing and generating energy that is configured for performing the method as described above, with the cell comprising:
  a reactor with an anode compartment having an anode and
    a cathode compartment having a cathode; and
  a number of cell units separating the anode and cathode
    compartments, wherein the cell unit comprises an anion
    exchange membrane, a cation exchange membrane,
    and a bipolar membrane, wherein the membranes
    defining compartments.

The cell provides the same effects and advantages as those as described for the method.

More specifically, the cell enables storage of energy in an energy storage state as chemical energy at time periods of an energy surplus, and providing electrical energy in an energy generation state by converting these components in time periods of energy shortage. As the cell is configured to keep the difference in water activity between both fluids in contact with the bipolar membrane to a minimum, this provides an effective system to store energy that can be regenerated.

In a presently preferred embodiment according to the present invention, the cell unit comprises a hexagonal shape.

Providing a hexagonal cross-flow cell for the three chamber cell unit, an effective cell configuration is provided. The hexagonal shape for the cell unit particularly provides for minimal pressure drops at the inlet and/or outlet of the cell unit. This renders the configuration relatively effective as compared to conventional systems.

In a presently preferred embodiment, the fuel cell comprises a pump controller that is configured to control a pump speed based on the difference in water activity difference of the fluids in contact with the bipolar membrane. By manipulating pump speed, the difference in water activity of the fluids in contact with the bipolar membrane can be maintained at a minimum level, thereby improving the overall efficiency of the method, and preventing ballooning and/or delaminating of the (laminated) bipolar membrane. In addition thereto, or as an alternative there for, pump speed of electrolytic background fluids can be controlled.

Further advantages, features and details of the invention are elucidated on the basis of preferred embodiments thereof, wherein reference is made to the accompanying drawings, in which.

Figure 8:
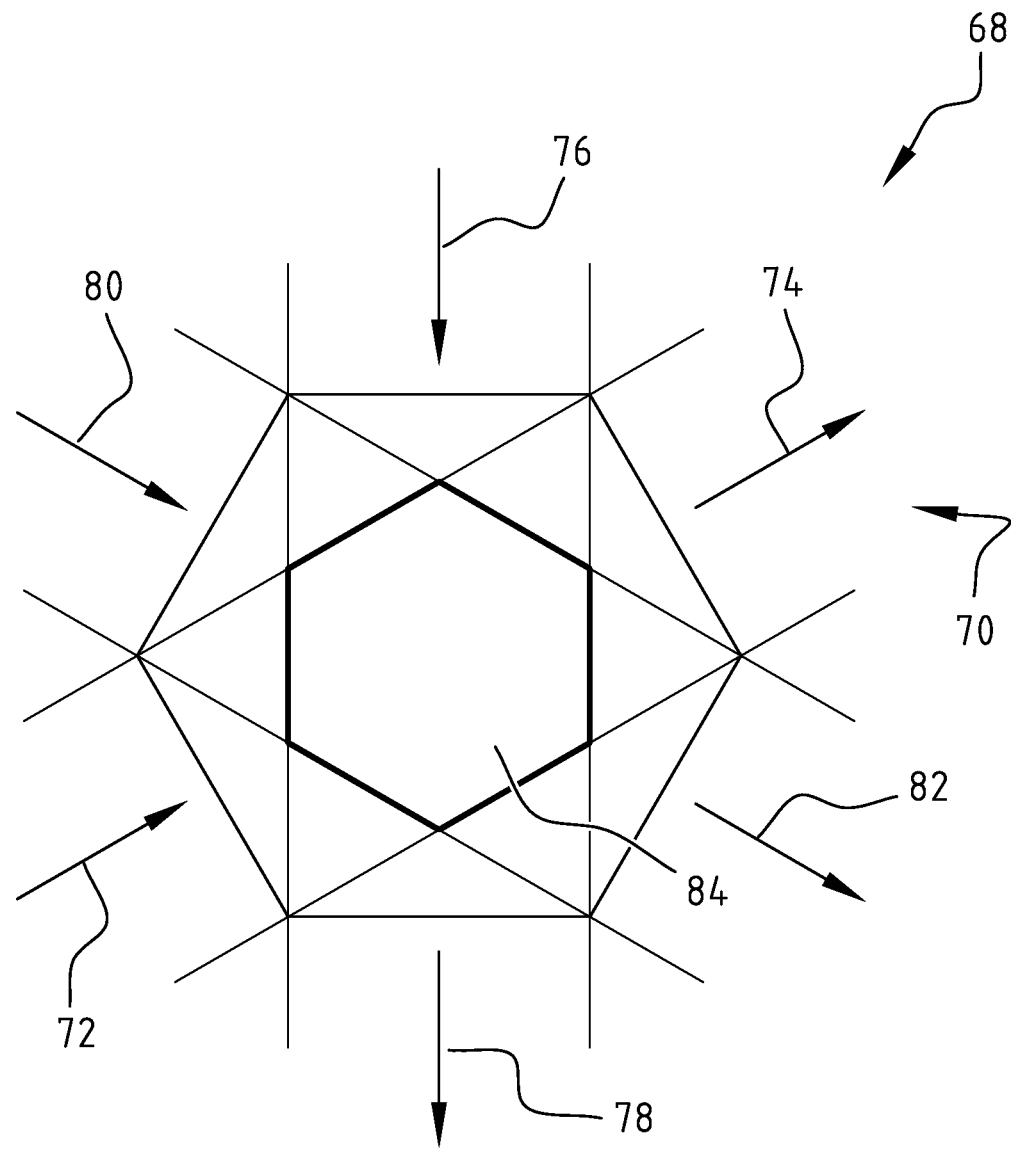
Figure 9:
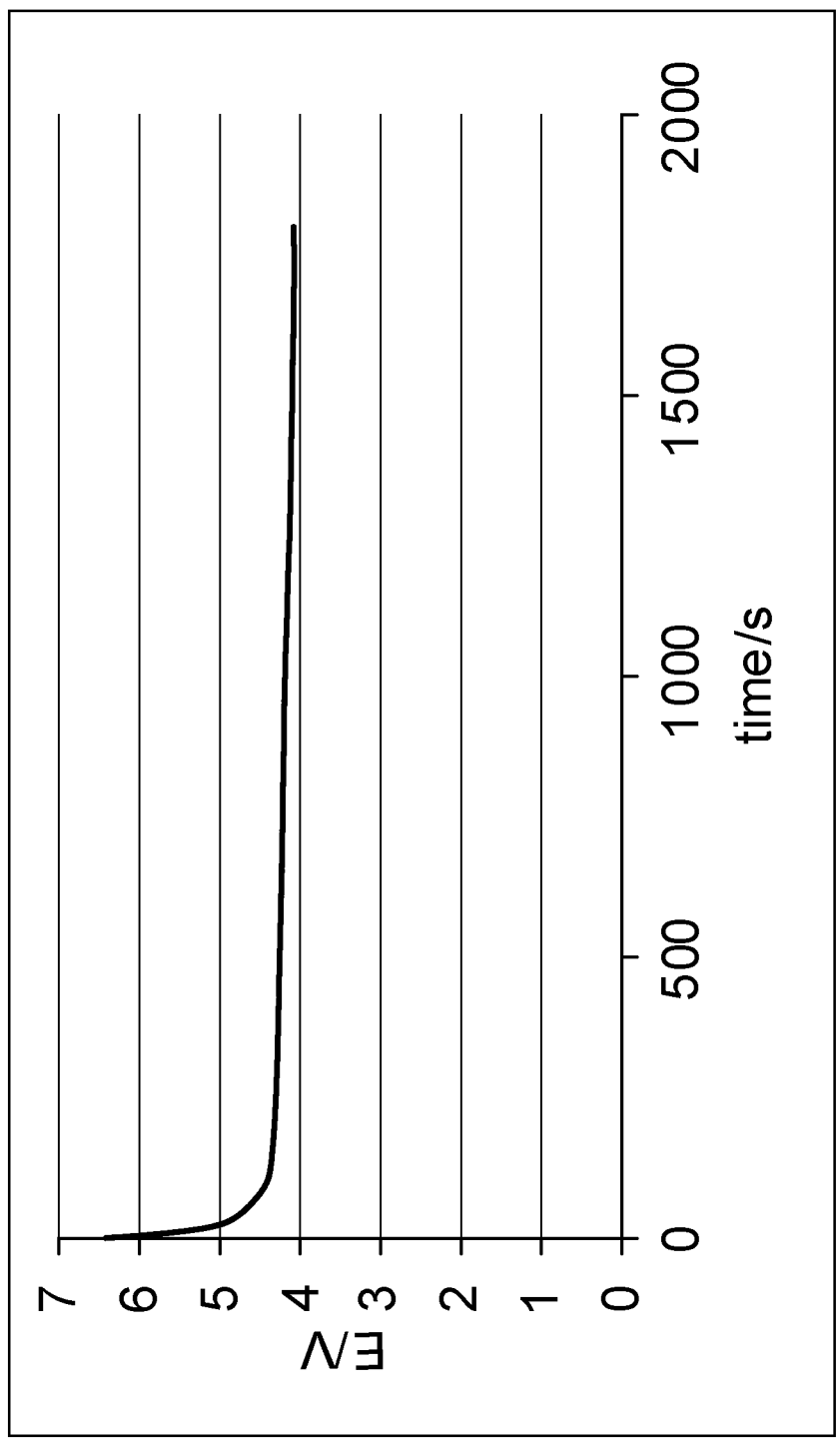
Figure 10:
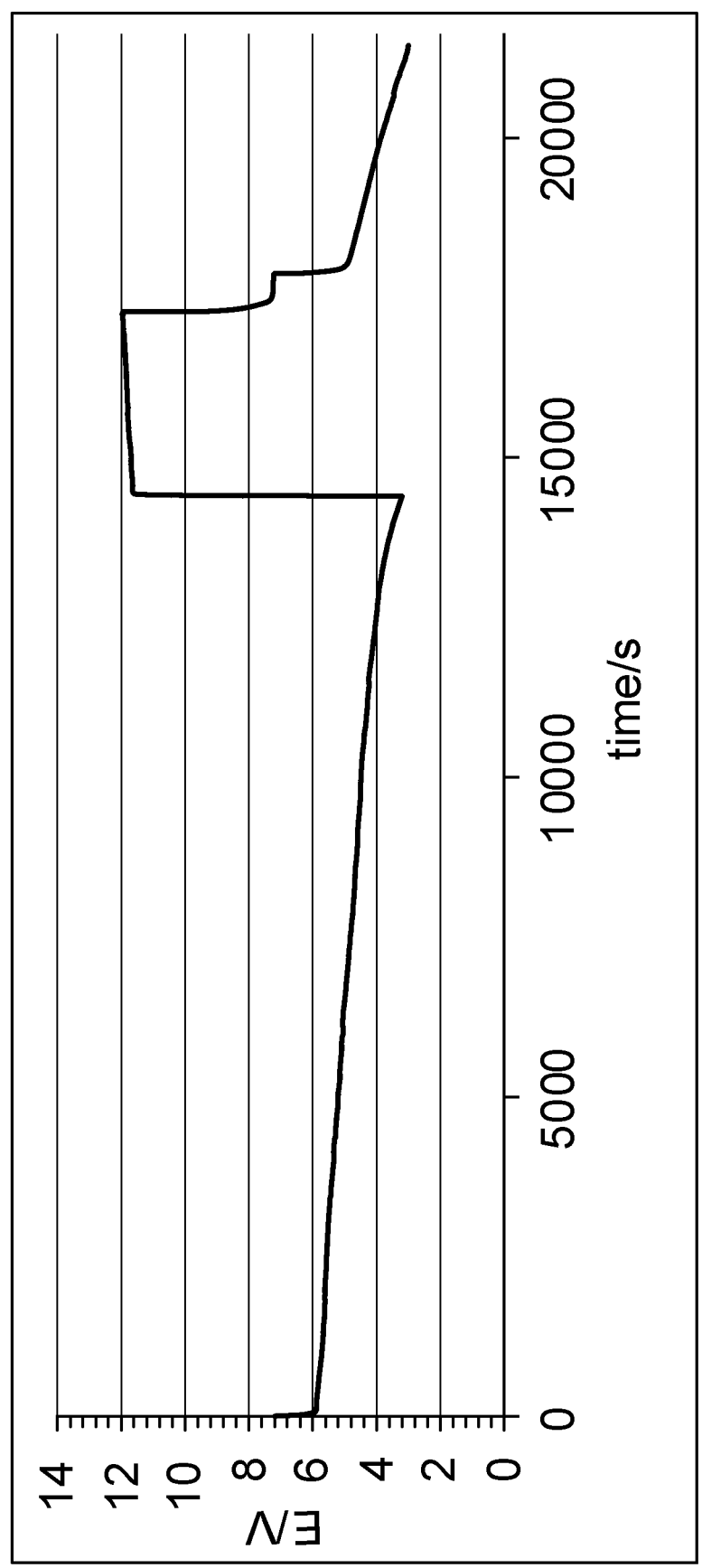

FIG. 3A-E show the difference in water activity vs. molality of some solutions;

FIGS. 4-7 show some experimental results;

FIG. 8 shows a hexagonal shape for the cell unit according to the present invention;

FIG. 9 shows the stack voltage response to a discharge current density of 20 A/m$^2$; and FIG. 10 shows the stack voltage at different conditions.

Figure 1:
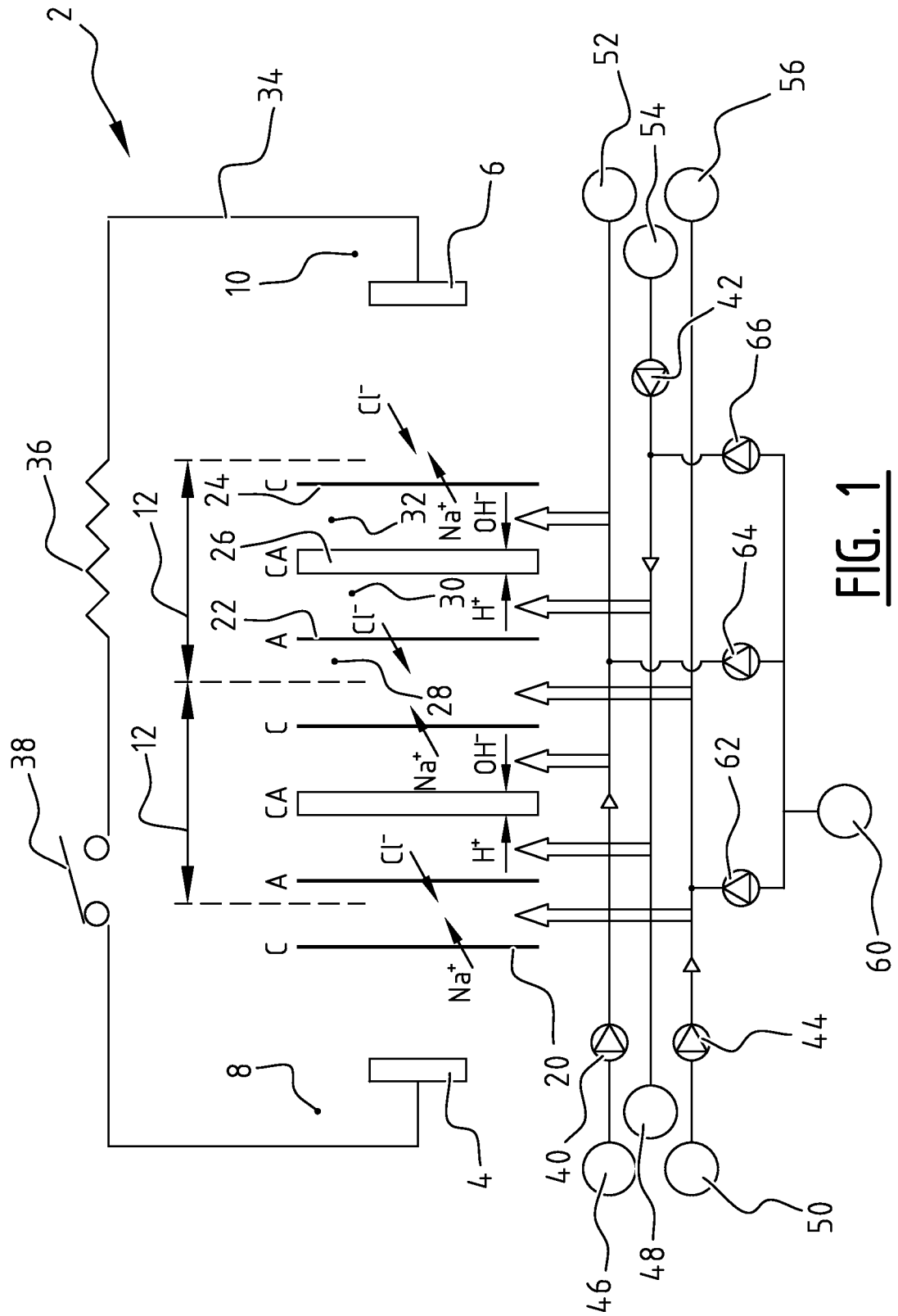
FIG. 1 shows a configuration of a reactor capable of performing the method according to the present invention.

Regenerative bipolar membrane fuel cell 2 (FIG. 1) comprises first electrode 4 and second electrode 6 in first electrode compartment 8 and second electrode compartment 10, respectively. It will be understood that another number and/or configurations of electrode could also be envisaged in accordance with the invention. Between electrodes 4, 6 a number of membranes are provided that separate electrode compartments 8, 10. In the illustrated embodiment, two cell units 12 are provided. Between second cell unit 12 and first electrode 4 cation exchange membrane 20 is provided.

Each cell unit 12 comprises anion exchange membrane 22 and cation exchange membrane 24 that are separated by bipolar membrane 26. Cell unit 12 defines three compartments 28, 30, 32. In use, first compartment 28 is provided with a salt solution, such as 0.5 mol/l NaCl. In use, second chamber 30 is provided with an acid solution, such as 0.5 mol/l acid solution HCl. In use, third compartment 32 is provided with a base solution, such as 0.5 mol/l NaOH.

Electrodes 4, 6 are connected via circuit 34. In the illustrated embodiment, system 2 is shown in the electrical energy generating state wherein a circuit 34 comprises load 36. Furthermore, circuit 34 comprises switch 38 for switching on and off the electrical energy generation of system 2. Electrodes 4, 6 are made of titanium mesh, e.g. with a mixed metal oxide coating like $Pt_xIr_y$, $Ru_xIr_y$, $Ta_xIr_y$.

Experiments performed with a system according to system 2 with ten cell units 12 that are placed in series between electrodes 4, 6, having (additional) cation exchange membrane 20 and one of cation exchange membranes 16 of cell unit 12 as end membranes. The solution for the electrode compartments 8, 10 that was used in the experiments was 0.5 mol/l $Na_2SO_4$. Salt solution for the three chamber cell unit 12 was 0.5 mol/l NaCl, base solution was 0.5 mol/l NaOH, and acid solution was 0.5 mol/l HCl. Results with this configuration will be described later.

In the illustrated embodiment system 2 comprises separate pumps 40, 42, 44 for the three specific fluids. It will be understood that also separate pumps can be provided for each individual compartment to enhance control possibilities. In the illustrated embodiment, fluids are stored in containers 46, 48, 50, 52, 54, 56. It will be understood that another configuration and/or number of containers can be provided in accordance with the invention. For illustrative reasons only, the containers for the fluids leaving system 2 are not shown in the figures.

Figure 2:
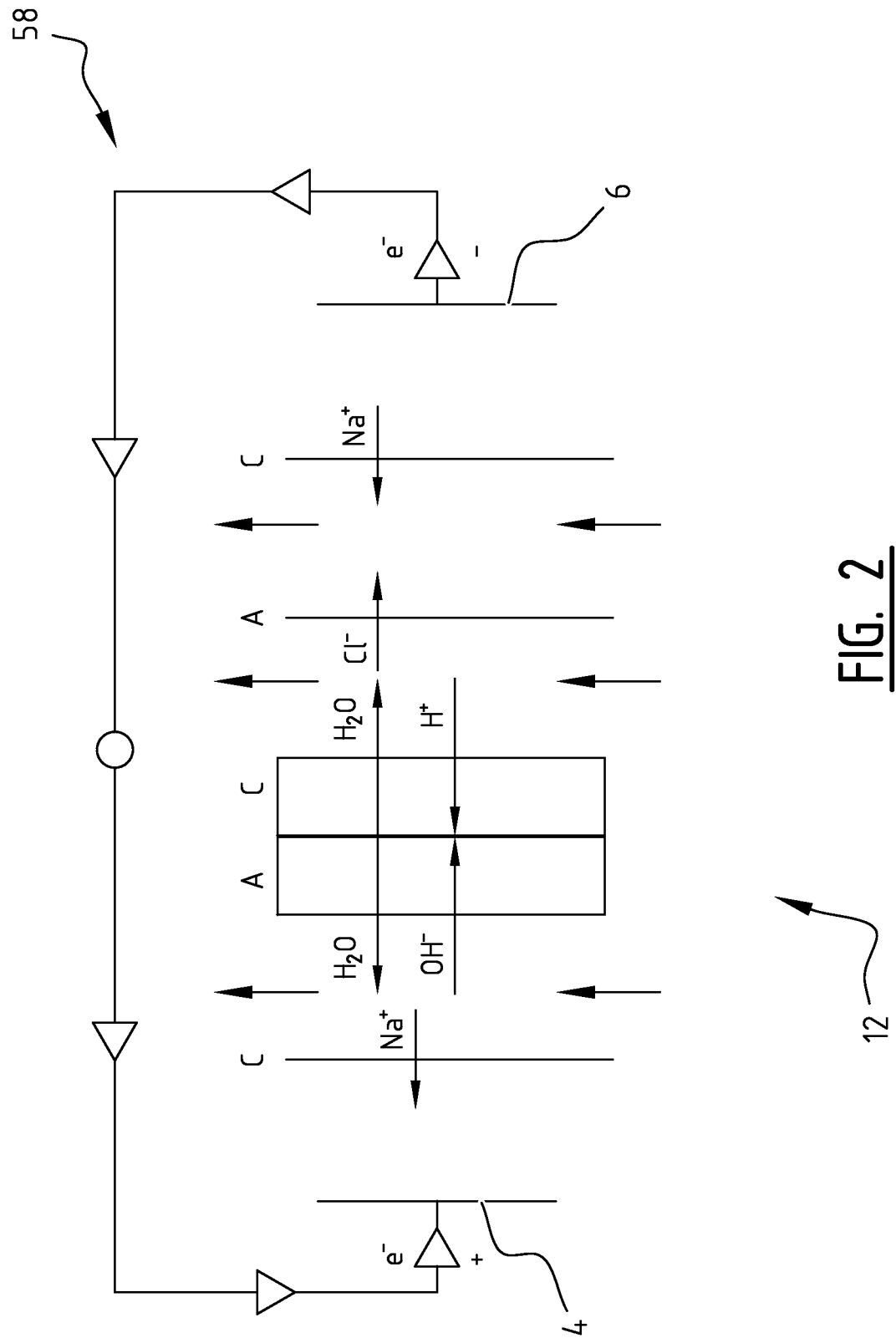
FIG. 2 shows an alternative configuration.

System 58 (FIG. 2) comprises electrodes 4, 6 and cell unit 12 to illustrate the principle of electrical energy generation. In the illustrated embodiment, electrode reactions at electrodes 4, 6 include at electrode 4 the reaction $4H_2O+4e^- \rightarrow 2H_2+4OH^-$ and at second electrode 6 $2H_2O \rightarrow 4e^-+O_2+4H^+$. Electrode 4 acts as cathode and electrode 6 acts as anode, in the illustrated energy generating state of system 58. In the illustrated electrical energy generation, the concentrated NaOH and HCl solutions are diluted while the NaCl fluid is concentrated in this state.

Optionally, background electrolytic fluid from container 60 (FIG. 1) is provided by separate pumps 62, 64, 66 to the other three fluids. It will be understood that other configurations for the electrolytic fluid with one or more additional containers 60 and/or a different number of pumps 62, 64, 66 could also be envisaged in accordance with the present invention.

Figure 3A:
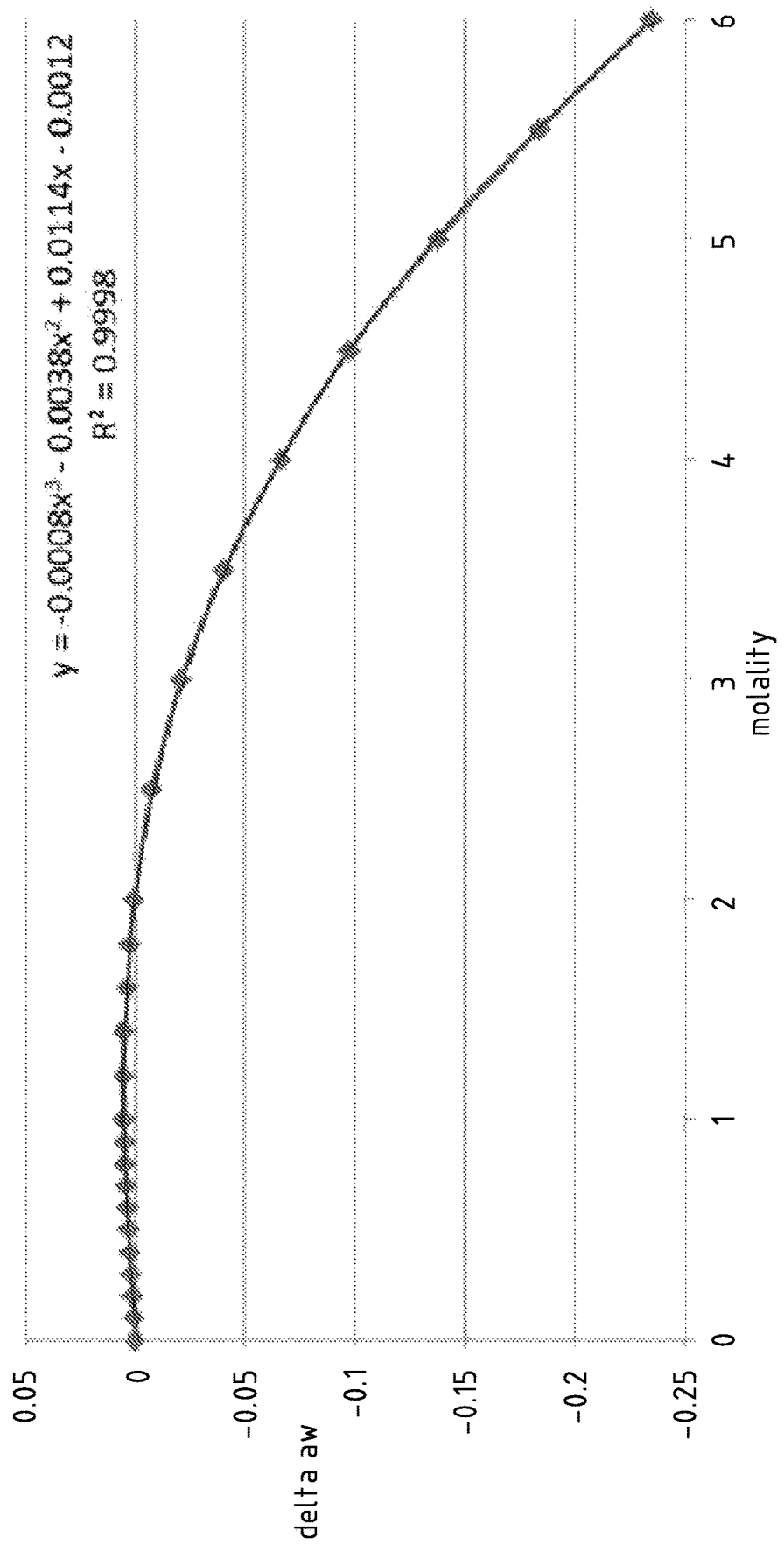
Figure 3B:
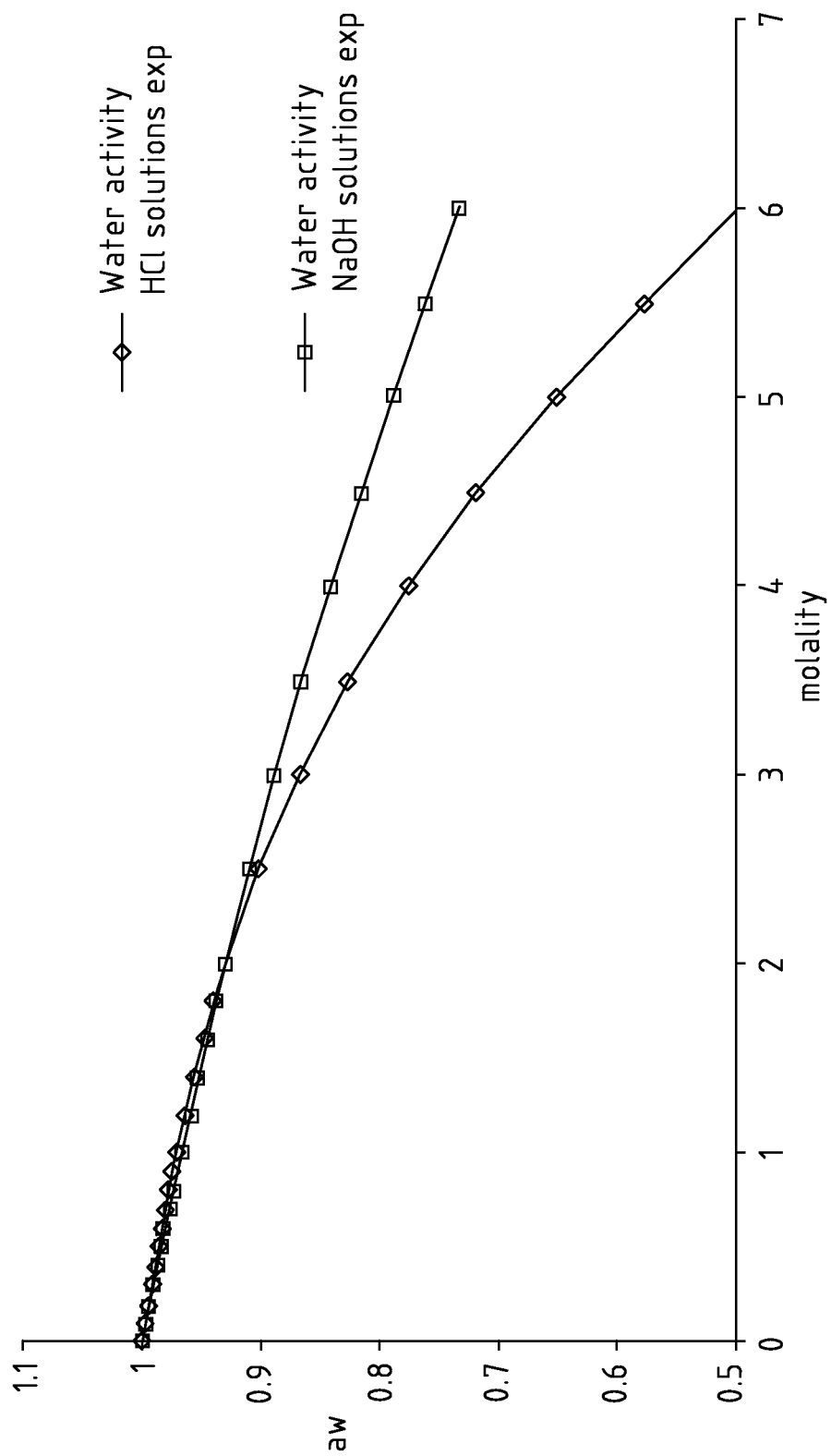
Figure 3C:
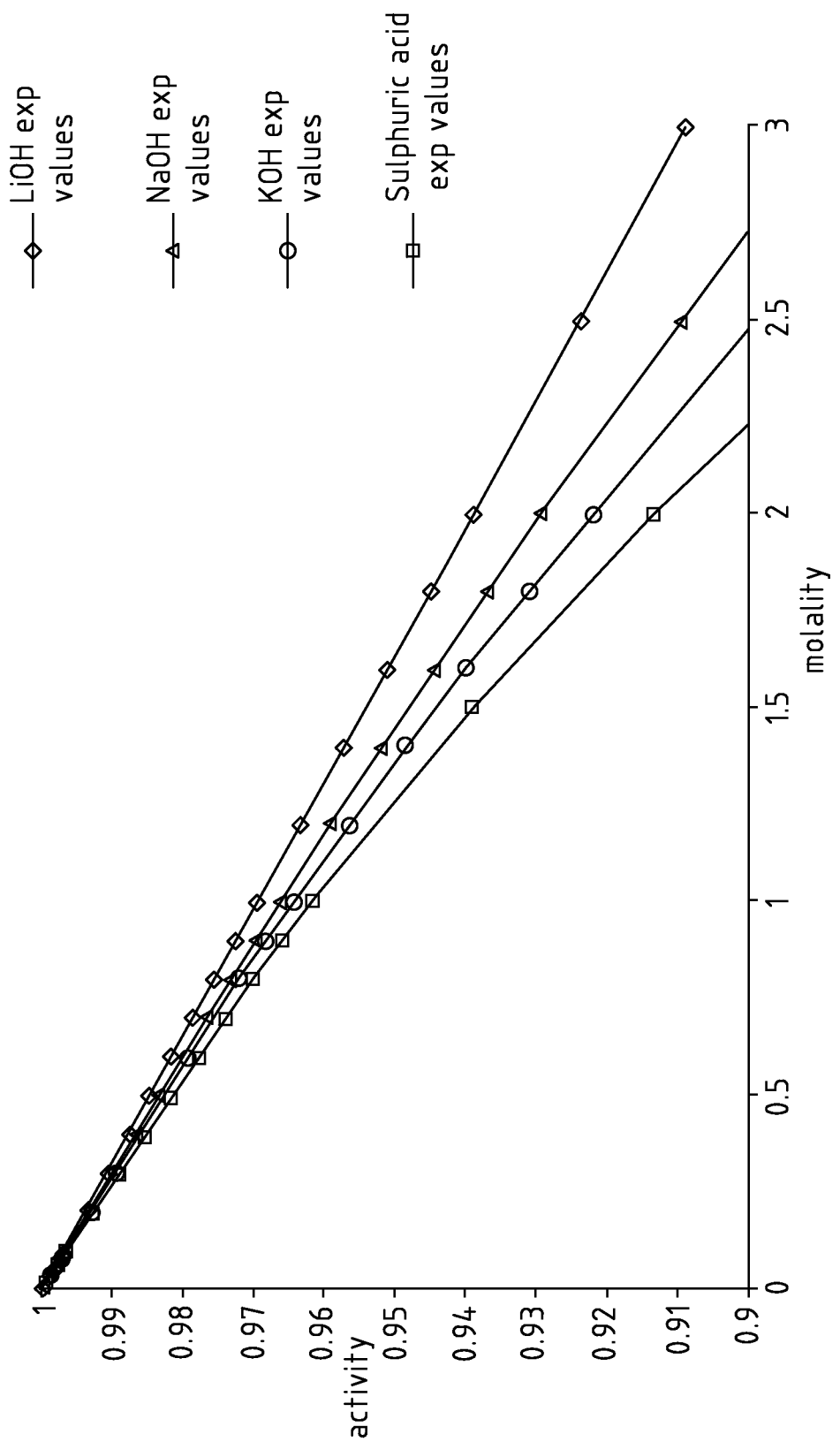

For NaOH and HCl solutions water activity difference is illustrated in FIG. 3A vs. molality. For molalities up to two water activities for both solutions are about equal (see also FIG. 3B). For higher molalities water activity difference start to increase significantly. In case the method according to the present invention is performed at higher molalities, water activities have to be chosen carefully. For example, water activity of NaOH with a molality of 6 is about equal to the water activity of HCl with a molality of about 4.5. At these levels, the difference in water activity of both HCl solution and NaOH solution in contact with the bipolar membrane can be kept to a minimum. This illustrates a possible approach to manipulate the difference in water activity difference of both fluids in contact with bipolar membrane 26. As an alternative, or in addition thereto, background electrolyte fluids can be used to reduce the difference in water activity of fluids in contact with the bipolar membrane.

Water activity (FIG. 3C) is shown vs. molality of suphuric acid (□), LiOH (◇), NaOH (Δ) and KOH (○) with closest fits shown for the solutions. Depending on the molality of a fluid the corresponding water activities of other fluids can be shown depending on the molality. It will be understood that other solutions also show similar water activities in relation to molality, thereby enabling manipulation of the difference in water activity of both fluids in contact with bipolar membrane 26.

Figure 3D:
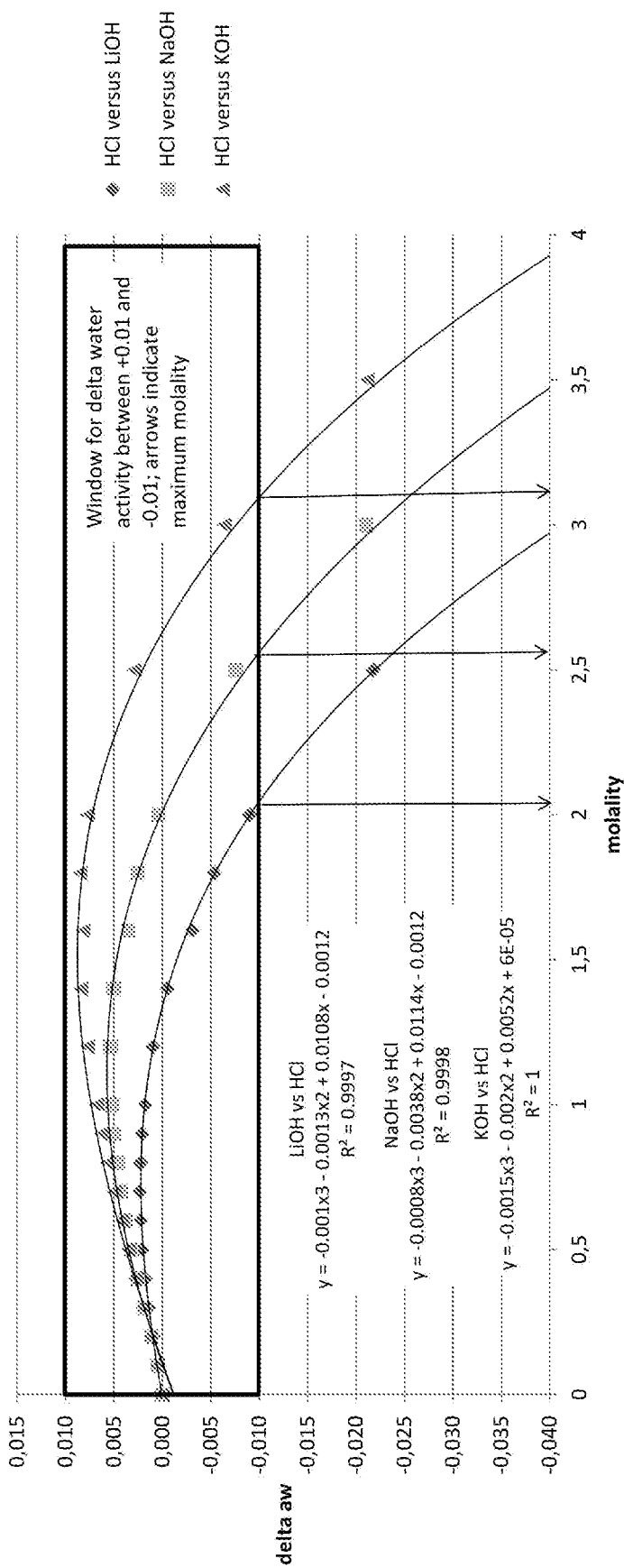
Figure 3E:
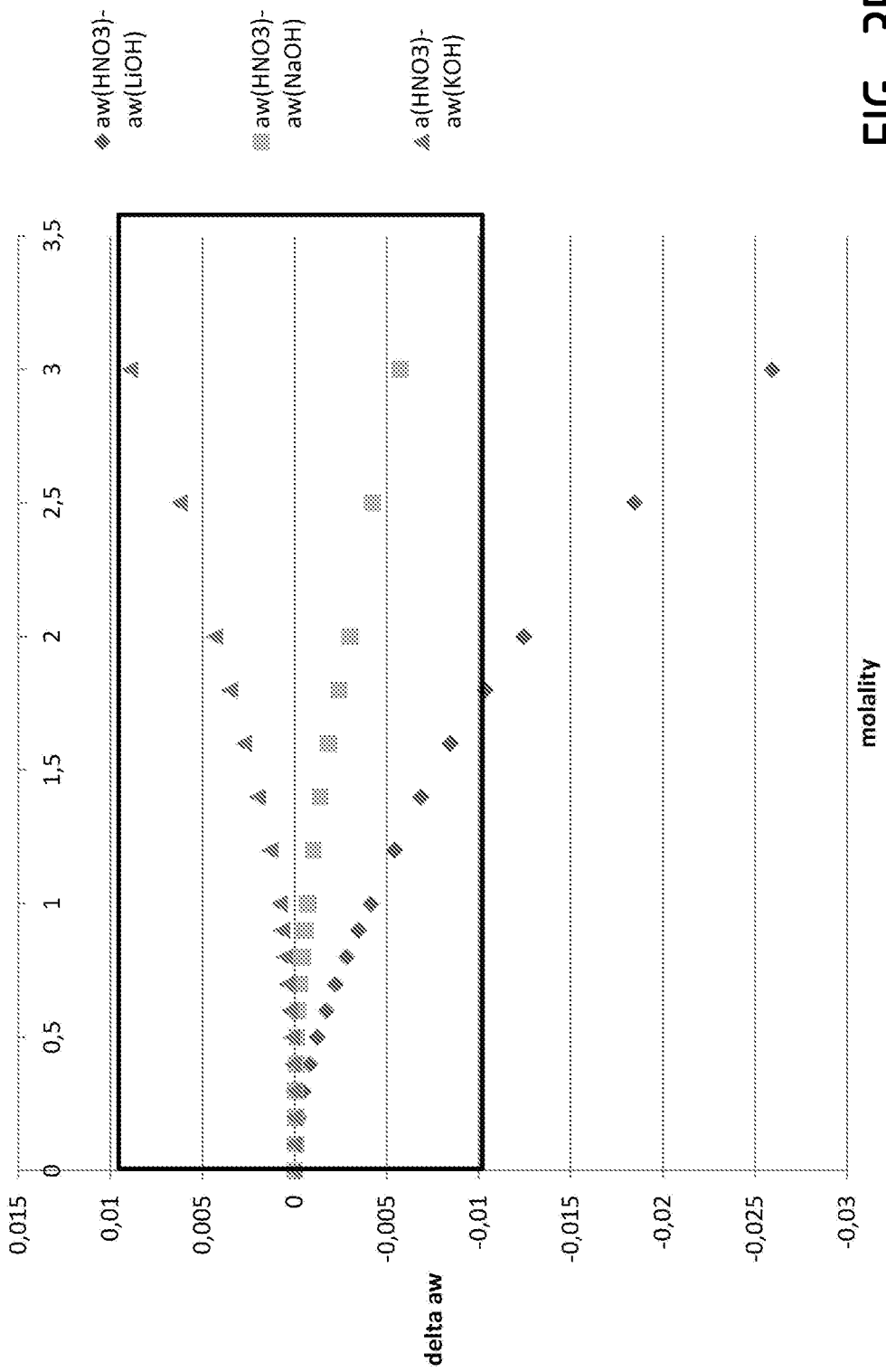

FIG. 3D shows water activity difference versus molality for HCl versus LiOH (◇), HCl versus NaOH (□), and HCl versus KOH (Δ) with their closest fits. Also shown is a range for water activity differences of 0.01. Highest possible molality for the illustrated water activity range is achieved with a system with KCl leading to HCl and KOH. FIG. 3E shows water activity difference versus molality for $HNO_3$ versus LiOH (◇), NaOH (□) and KOH (Δ), together with their closest fits and a water activity range of 0.01. It is shown that the system with $NaNO_3$ leading to NaOH and $HNO_3$ has the smallest difference in water activity of both fluids, comprised of NaOH and HNO$_3$ solutions with equal molality, in contact with bipolar membrane 26, and is capable of operating at the highest molality thereby improving the overall efficiency of the method, and preventing ballooning and/or delaminating of (laminated) bipolar membrane 26.

The results show several combinations that can be used in a method and/or system according to the present invention, such as KNO$_3$ and preferably NaNO$_3$. It will be understood that also other solutions could be used in accordance with the present invention.

Figure 4:
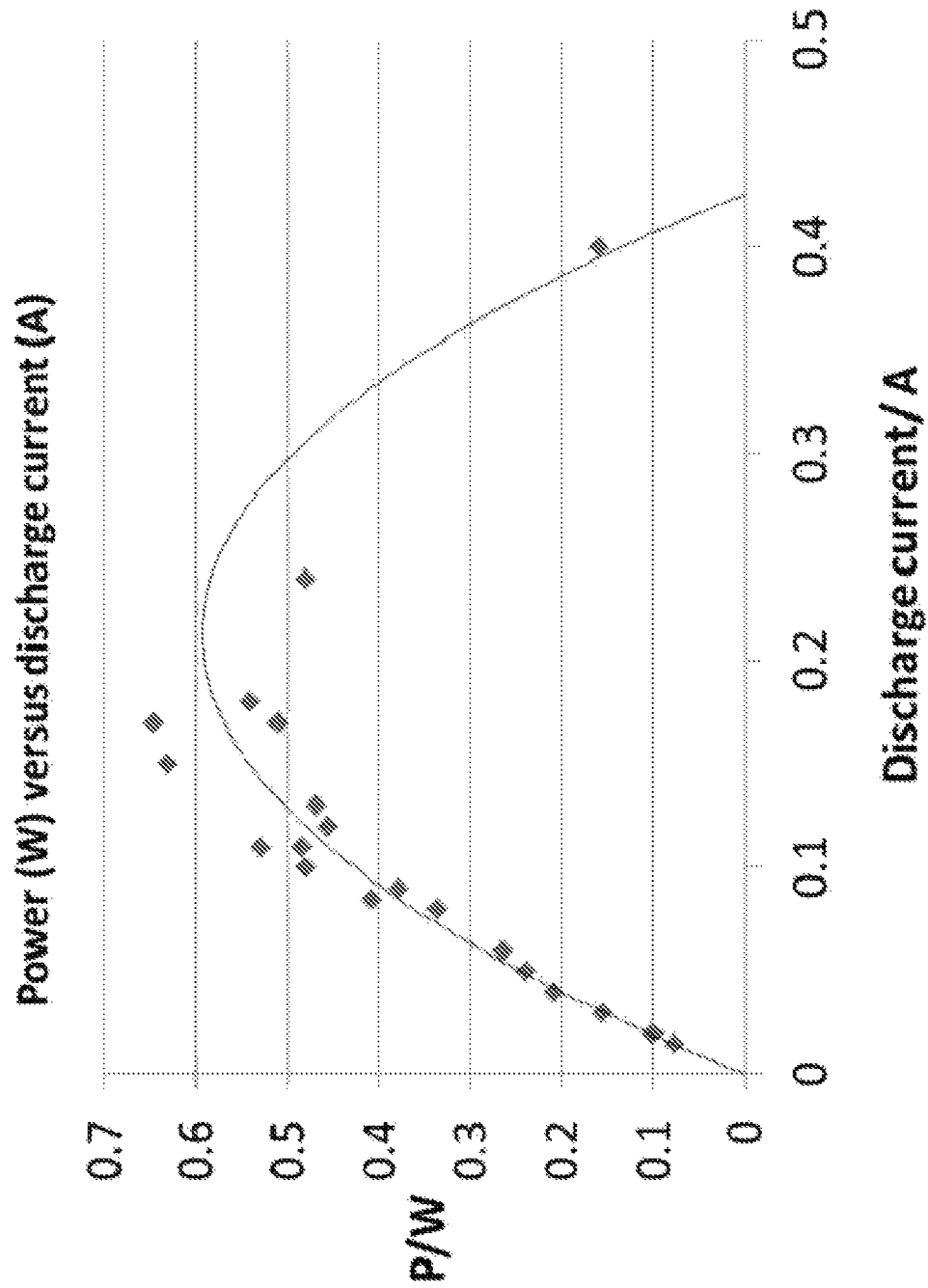
Figure 5:
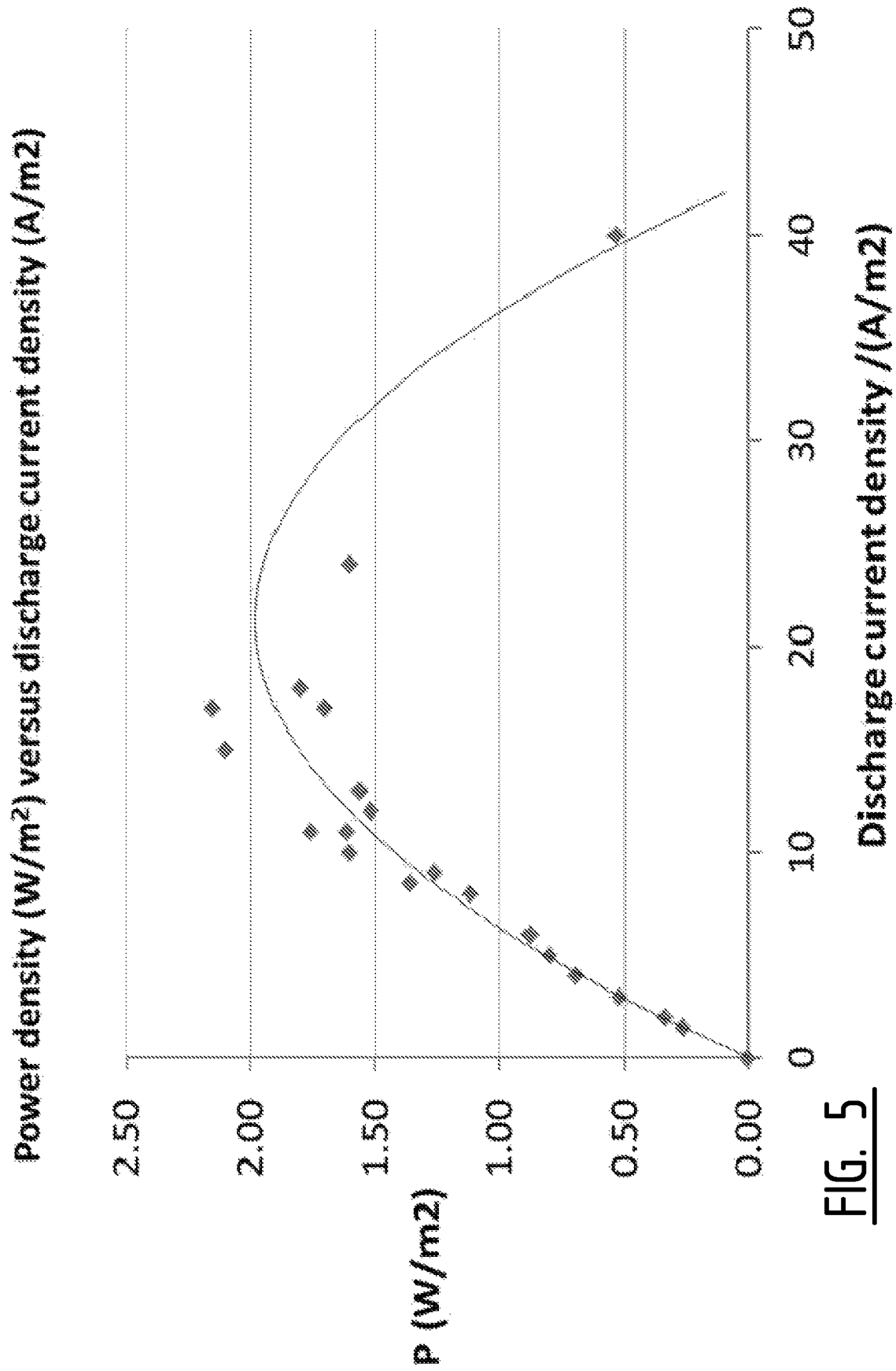

The aforementioned experiment is performed with a ten cell unit system, wherein an effective area of 100 cm$^2$ for each membrane is used. Results are shown in FIGS. 4-7. The maximum power that is obtained was about 0.65 Watt. The effective electrode area was about 100 cm$^2$. The total installed membrane area was about 3.000 cm$^2$. The tests were being performed at room temperature. FIG. 4 shows the power vs. discharge current. FIG. 5 shows power density (Watt/m$^2$) vs. discharge current density (A/m$^2$), wherein the total installed membrane area was used to calculate the power density and the electrode area is used to calculate the current density. In the experiment, electrode reactions comprised a water oxidation reaction to oxygen gas and a water reduction reaction to hydrogen gas. This resulted in relatively high voltage losses at the electrodes in relation to the limited number of membrane units that are placed in series between the electrodes. By increasing the number of cell units 12 between electrodes 4, 6, these losses can be minimized.

Figure 6:
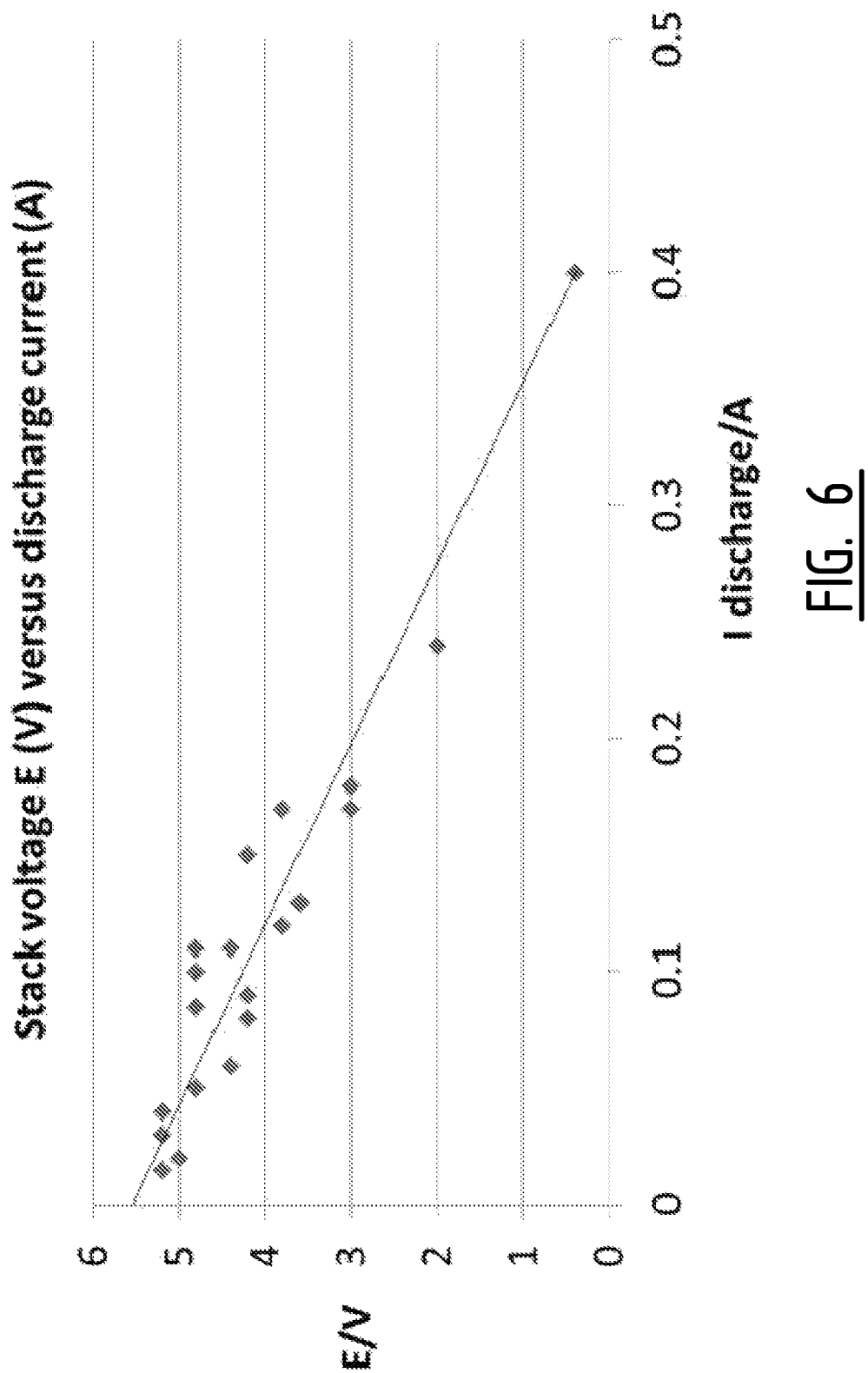
Figure 7:
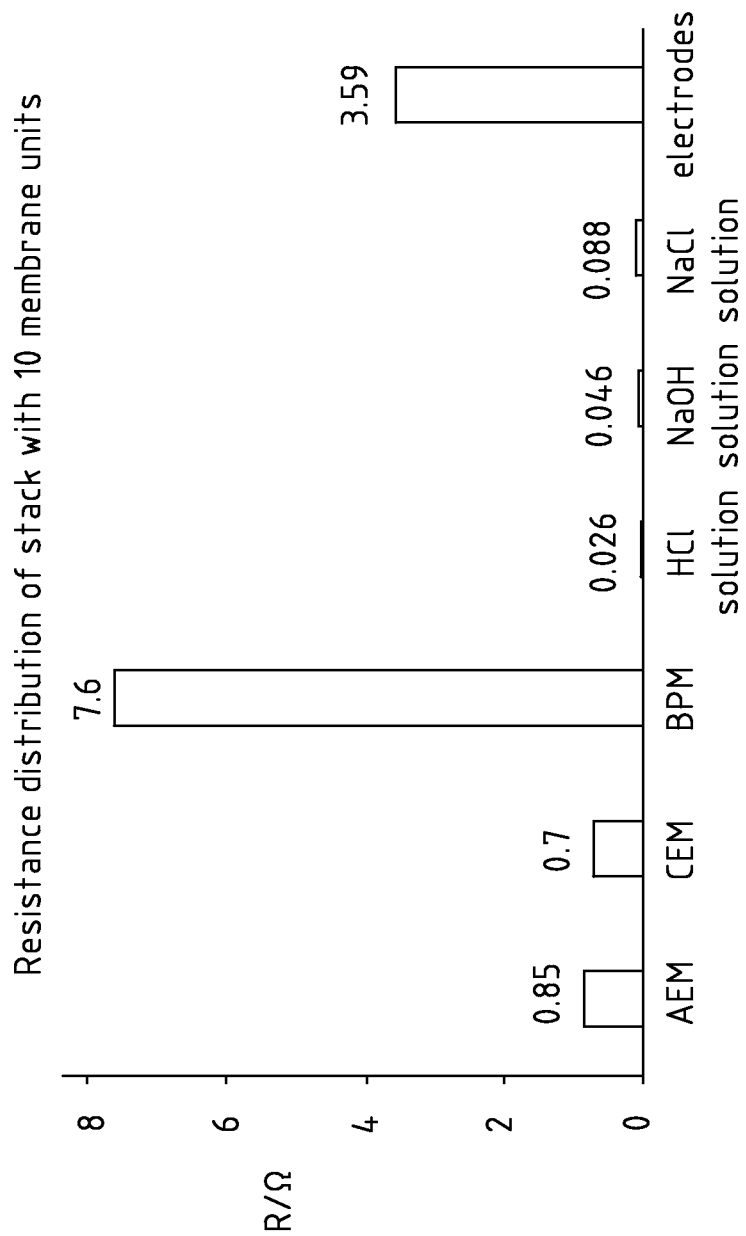

FIG. 6 illustrates the stack voltage vs. discharge current, showing a slope of the curve of about 12.9 Ohm. Stack voltage is lowered with the losses that occur at the electrodes where water oxidation and water reduction reactions take place. The slope of the curve can be decreased by increasing the number of membranes between the electrodes, since this reduces the influence of the relative voltage losses at the electrodes. The resistance distribution was calculated from the membrane resistances (Ralex) anion and cation exchange membranes and Fumatech bipolar membrane. FIG. 7 illustrates the resistance distribution of the ten membrane unit stack with a cation exchange membrane (CEM), bipolar membrane (BPM) and anion exchange membrane (AEM) per cell unit 12, and the solutions and electrodes 4, 6.

The experiment illustrates the applicability of the method for storing and (re)generation of electrical energy according to the present invention.

In an alternative embodiment, stack 68 of cell units 12 (FIG. 8) is provided with hexagonal shape 70. Stack 68 has inlet 72 and outlet 74 for the salt solution, inlet 76 and outlet 78 for the acid solution, and inlet 80 and outlet 82 for the base solution. Hexagonal shape 70 defines an active region 84 for stack 68. Hexagonal shape 70 reduces pressure losses at inlets and outlets of stack 68.

Further experiments have been performed with an experimental setup according to system 2 with ten cell units 12 that are placed between electrodes 4, 6. In this experiment the electrodes have an electrode area of about 100 cm$^2$. Total installed membrane area for 10 cells having three different membrane types, i.e. AEM, CEM and BPM, is about 0.3 m$^2$. During the experiment that the maximum duration of the discharge was about 20 A/m$^2$ was about 4 hours. Applied solutions involved 1 M NaOH and 1 M HCl. No ballooning of the BPM was experienced in the experiment(s) during discharge when energy was generated from system 2.

The stack voltage response to a discharge current density of 20 A/m$^2$ (FIG. 9) shows a smooth discharge curve. After a rapid decrease in voltage at the start, the voltage slowly stabilizes. In the experiment it was noticed that the pH of NaCl changed from neutral to 11.5, which could be caused higher co-ion transport of hydroxyls as compared to proton co-ion transport.

A further experiment to test the performance of system 2 during six hours was performed. It was started with freshly prepared 1 M HCl, 1 M NaOH and 0.5 M NaCl solutions. The test comprised different phases, starting with a 4 hour discharge at 20 A/m$^2$, followed by an equivalent 1 hour charge of 100 A/m$^2$, then 10 minutes Open Circuit Voltage (OCV) conditions, and finally a 1 hour discharge at 20 A/m$^2$.

The stack voltage monitored in the experiment (FIG. 12) shows an effective discharge of the system for 4 hours. Then, the system can be charged, reaching pH=13 for the base and pH=3 for the acid. The OCV returns to the initial voltage. Next, a 1 hour final discharge is achieved in the experiment. Furthermore, in the experiment it was noticed that the pH of the NaCl solution decreased to pH=2 almost immediately and was maintained at this level throughout the rest of the experiment. This may indicate that co-ion transport of protons was larger than hydroxyl co-ion transport. In the first discharge in can be calculated that about 28800 C were harvested, which indicates a coulombic efficiency, η, of about 30%, as compared to the (theoretical) maximum of 96485 C that are potentially present in 1 M HCl and 1 M NaOH. In the second charge and discharge, it can be calculated that the coulombic efficiency is about 25%, because of the 28800 C applied in the charge and 7140 C harvested during discharge.

The experiments show the applicability of the invention. It will be understood that similar results could be achieved with different experimental setups. For example, the number of cell may be varied.

The present invention is by no means limited to the above described preferred embodiments thereof. The rights sought are defined by the following claims, within the scope of which many modifications can be envisaged.

The invention claimed is:

1. A method for operating a regenerative bipolar membrane fuel cell, the method comprising the steps of:
    providing a regenerative bipolar membrane fuel cell comprising:
        a reactor with an anode compartment having an anode and a cathode compartment having a cathode; and
        a number of cell units separating the anode and cathode compartments, wherein the cell unit comprises an anion exchange membrane, a cation exchange membrane, and a bipolar membrane, with the membranes defining compartments;
    providing a number of fluids to the cell, with at least a fluid on both sides of the bipolar membrane with ion concentrations such that the difference in water activity of the fluids on both sides of the bipolar membrane is minimized, wherein the difference in water activity of both fluids in contact with the bipolar membrane is maintained within the range of −0.015 to +0.015;
    storing energy in an energy storage state by providing an external current to the reactor such that a pH difference between fluids in contact with the bipolar membrane is achieved;
    switching between the energy storage state and an energy generation state; and regenerating energy in the energy generating state from the pH difference between fluids in contact with the bipolar membrane.

2. The method according to claim 1, wherein the difference in water activity of the fluids on both sides of the bipolar membrane is minimized in the energy generation state.

3. The method according to claim 1, wherein storing energy comprises water splitting.

4. The method according to claim 3, wherein the water splitting is performed in the bipolar membrane.

5. The method according to claim 1, wherein in use the reactor is provided with first, second and third fluids, the first fluid comprising a salt solution, the second fluid comprising an acid solution, and the third fluid comprising a base solution.

6. The method according to claim 5, wherein the salt solution comprises one or more of the following ions: $Li^+$, $Na^+$, $K^+$, $Mg^{2+}$, $Ca^{2+}$, $Ba^{2+}$, and $Cl^-$, $F^-$, $Br^-$, $I^-$, $SO_4^{2-}$, $NO_3^-$, $ClO_4^-$.

7. The method according to claim 6, wherein the base solution comprises one or more of the following ions: $Li^+$, $Na^+$, $K^+$, $Mg^{2+}$, $Ca^{2+}$, $Ba^{2+}$, and $OH^-$.

8. The method according to claim 7, wherein the acid solution comprises one or more of the following ions: $H^+$, and $F^-$, $Cl^-$, $Br^-$, $I^-$, $SO_4^{2-}$, $NO_3^-$, $ClO_4^-$.

9. The method according to claim 8, wherein the acid solution comprises HCl, the base solution comprises LiOH and/or NaOH and/or KOH, and the salt solution comprises LiCl and/or NaCl and/or KCl.

10. The method according to claim 9, wherein the acid solution comprises $HNO_3$, the base solution comprises LiOH and/or NaOH and/or KOH, and the salt solution comprises $LiNO_3$ and/or $NaNO_3$ and/or $KNO_3$.

11. The method according to claim 1, wherein the difference in water activity of both fluids in contact with the bipolar membrane is maintained within the range of −0.012 to +0.012.

12. The method according to claim 1, further comprising the step of supplying an additional electrolytic fluid and/or an organic compound, such that water activity of such fluid is maintained.

13. The method according to claim 1, further comprising the step of controlling the difference in water activity of both fluids in contact with the bipolar membrane.

14. The method according to claim 13, wherein controlling the difference in water activity of both fluids in contact with the bipolar membrane comprises controlling pump speed for one or more of the fluids with a pump controller.

15. The method according to claim 11, further comprising the step of supplying an additional electrolytic fluid and/or an organic compound, such that water activity of such fluid is maintained.

16. The method according to claim 11, further comprising the step of controlling the difference in water activity of both fluids in contact with the bipolar membrane.

17. The method according to claim 16, wherein controlling the difference in water activity of both fluids in contact with the bipolar membrane comprises controlling pump speed for one or more of the fluids with a pump controller.

18. The method according to claim 11, wherein the difference in water activity of both fluids in contact with the bipolar membrane is maintained in the range of −0.01 to +0.01.

* * * * *